Nov. 14, 1933.                L. A. WIGGINS                1,935,425
                               PIPE FITTING
                           Filed March 19, 1931
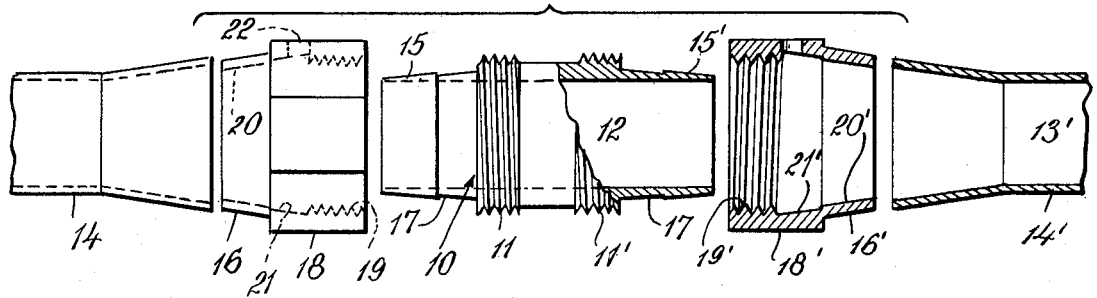
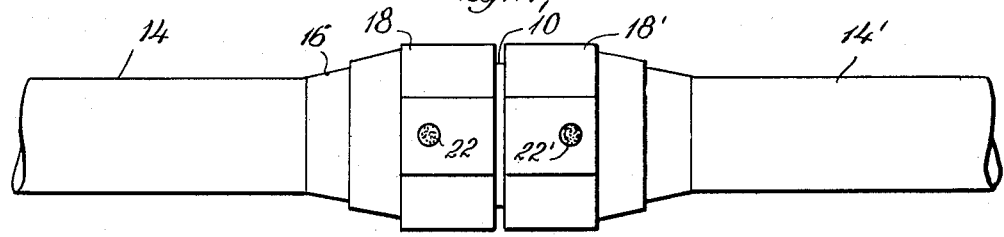
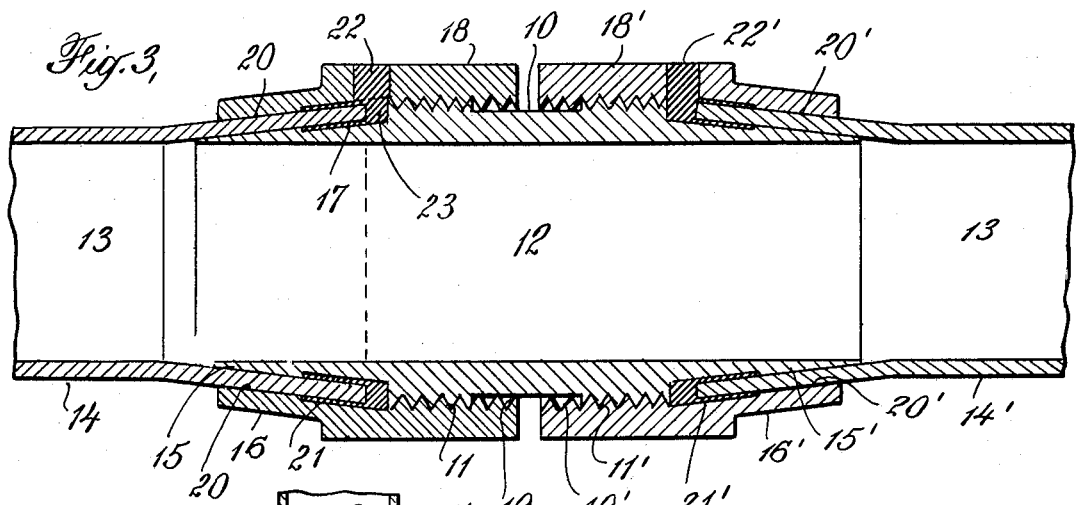
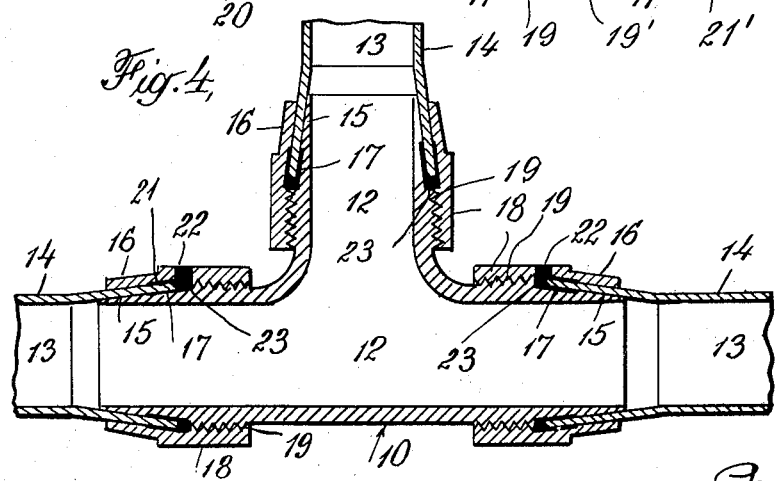
INVENTOR
Leslie A. Wiggins
BY
ATTORNEYS Patented Nov. 14, 1933

1,935,425

UNITED STATES PATENT OFFICE 1,935,425

PIPE FITTING

Leslie A. Wiggins, Rome, N. Y., assignor to Revere Copper & Brass Incorporated, Rome, N. Y., a corporation of Maryland Application March 19, 1931. Serial No. 523,773

3 Claims. (Cl. 285—86)

This invention relates to pipe-fittings and has for its object certain improvements in pipe-fittings. The invention relates more particularly to an improved pipe coupling, union, expansion-pipe sleeve or the like.

Numerous proposals have been advanced in the art of pipe couplings to provide a device that will permit the joining of pipe sections or pipe-fittings non-leakably. It is not uncommon, for example, to join two pipe sections by threading adjacent ends and then fitting a threaded sleeve over the pipe ends. An extremely tight fit is required to make the joint non-leakable; and the pipe material employed must lend itself to the type of threading required. This practice has the inconvenience that considerable threading must be done on the job, which is often inconvenient and expensive at best.

Pipe-fittings or couplings have likewise been proposed to avoid the type of joint just described, recourse being had to the use of a molten metal to seal the joint. In this type of structure, an outer slidable sleeve member is generally employed. For example, it has been proposed to insert the straight ends of two pipe sections into an unthreaded outer sleeve member, and then to pour a molten sealing metal through an opening in the sleeve to and between the outer surface of the pipe sections and the inner surface of the outer sleeve member. Due to expansion and contraction effects or rough handling and the like, such joints are apt to leak sooner or later.

As a result of my investigations, I have determined that a pipe coupling may be constructed that may be quickly employed on the job, without any additional threading operations, while at the same time making possible a joint that will not leak under normal operating conditions.

The type of construction contemplated by the present invention may perhaps be better understood if reference is made to the accompanying drawing, taken in conjunction with the following description, in which:

Fig. 1 is a longitudinal part section of a pipe fitting illustrative of the invention; the parts being shown in a non-assembled manner;

Fig. 2 is an outside view of the pipe fitting of Fig. 1, shown in a coupled or assembled condition;

Fig. 3 is a longitudinal section, in enlarged detail, of the fitting shown in Fig. 2 in its assembled form; and Fig. 4 is a transverse section of a T-joint illustrative of a practice of the invention.

Referring to Figs. 1, 3 and 4 more particularly, the pipe fitting shown comprises an inner sleeve or male member that is threaded on an outside portion 11, or 11'; depending on the type of connection that is to be made. The sleeve shown has an internal passageway 12, the internal diameter of which is advantageously the same, or approximately the same, as that 13 of a pipe section or conduit 14, or 14', to which it is to be connected.

The inner sleeve may of course take on various forms, depending upon the peculiar use to which it is to be put. Thus, in Figs. 1, 2 and 3, the sleeve is double-ended. That is to say, the sleeve is adapted for connection at both ends with pipe sections. The form shown in Fig. 4 may, however, be regarded as single-ended. That is to say, the sleeve is adapted for connection with a single pipe section at only one end. Such a form is particulurly adapted for elbows, T-joints and the like; in which case the so-called sleeve member may well be integral with the elbow or T-joint member itself, as shown.

A tapered end portion or conical end section 15, or 15', is provided at one or both ends of the sleeve. Thus, the outside surface of the sleeve is beveled at an angle to function as a seat for a flared end section 16 of the pipe section to which it is to be attached.

A grooved or recessed annular portion 17 is provided in or on the outside surface of the inner sleeve member between the tapering seat section and the threaded portion. This groove or recess is adapted to receive a suitable sealing material, such as molten solder.

The pipe fitting also includes an outside or female member 18, or 18', with a threaded portion 19 adapted to be threaded onto the inner threaded sleeve member. As in the case of the inner sleeve member, this outer member is provided with a tapering end portion or conical end section 20 adapted to form an internal seat for holding the flared end of the pipe section to which it is to be attached. This seat is preferably beveled at an angle corresponding substantially to that of the seat in the inner sleeve member. A grooved or recessed portion 21 is advantageously provided in or on the inner surface of this outer member, between the seat and the threaded portion, also to receive some of the sealing material.

One or more openings or ports 22 extend completely through the walls of the outer member, preferably adjacent to the threaded portion, connecting with the grooved or recessed portion;

both of the outer and of the inner members, when in coupled relation to one another. This opening gives easy access to the interior of the joint, for the introduction of suitable sealing material 23.

The above described pipe fitting or coupling may be used as follows in connecting two pipe sections:

In joining pipe sections 14 and 14', for example, their end sections 16 and 16' respectively, are flared at an angle to conform substantially to that of the seat 15 of the inner sleeve member 10 and of the seats 21 and 21' of the outer members 18 and 18', respectively. Either before or after this flaring operation, the outer member 18 is stripped over the pipe section 14; and the outer member 18' is stripped over the pipe section 14'. The outer members are then screwed onto the inner sleeve member 10. This screwing action is applied until both of the outer members have been tightly connected to the inner member.

As the outer members 18 and 18' are screwed toward one another, the flared sections 16 and 16' of the pipe sections are tightly gripped between the seats of the inner and outer members. The flared pipe sections preferably extend at least in part over the grooves or recesses of both the inner and outer members. The net result is to make a very tight and substantially unmovable joint.

In order to make the joint non-leakable, a suitable sealing material, such as molten solder, is introduced through the opening or port 22, 22'. The molten solder finds its way into the grooves or recesses 17 and 21, 17' and 21', thus providing a seal completely around the inside and outside of the flared pipe sections. The solder soon solidifies, and a very tight non-leakable joint is obtained.

Substantially the same general procedure is followed in connecting an elbow, T-joint or the like, to a pipe section, as shown in Fig. 4. In this type of construction, the so-called inner sleeve or male member 12 is part of the elbow or T-joint. As before, the outer threaded member is screwed over and onto the inner member.

It will thus be seen that in the practice of the invention a pipe-fitting may be provided that combines in a novel manner the use of a compression joint and a solder joint. These two types of joints may, therefore, be combined in such a way as to supplement one another; the net result being to provide a joint that is substantially non-leakable, and which is very strong. Furthermore, the elements going into the combination are so designed as to yield a pipe-fitting of pleasing contour. Certain variations in design are of course possible, while still operating within the principles of the invention.

I claim:

1. In coupling apparatus for holding the end of a pipe, the combination comprising an outer threaded member having a groove in the inner surface thereof, and an inner threaded member having a groove in the outer surface thereof, said inner and outer members adapted to be screwed together and grip a pipe end therebetween, said grooves forming openings between the inner threaded member and the pipe and between the outer threaded member and the pipe so constructed and arranged that the openings envelope the pipe end.

2. In coupling apparatus for holding the end of a pipe, the combination comprising an outer threaded member having a groove in the inner surface thereof, an inner threaded member having a groove in the outer surface thereof, said inner and outer members adapted to be screwed together and grip a pipe end therebetween, said grooves forming interconnected openings between the inner threaded member and the pipe and between the outer threaded member and the pipe, the outer member having a port opening forming a passageway from the outside to the opening formed between the pipe and the outer member whereby sealing material may be introduced through the port into the openings.

3. In an improved pipe coupling, the combination comprising an inner sleeve having two spaced threaded portions on the outside surface thereof, each end of the sleeve having a tapering grooved seat adapted to fit into a flared pipe section, and two outer coupling nut members having inner tapering grooved surfaces adapted to be screwed upon the inner sleeve member and to grip the ends of flared pipe sections therebetween and form interconnected openings between the grooves, each of the outer members having a port opening forming a passageway from the outside to openings formed between the pipe and the outer members whereby sealing material may be introduced into the openings from the outside after the coupling has been assembled.

LESLIE A. WIGGINS.